(No Model.)
J. L. PERRY.
ABRADING CYLINDER.
No. 285,666. Patented Sept. 25, 1883.
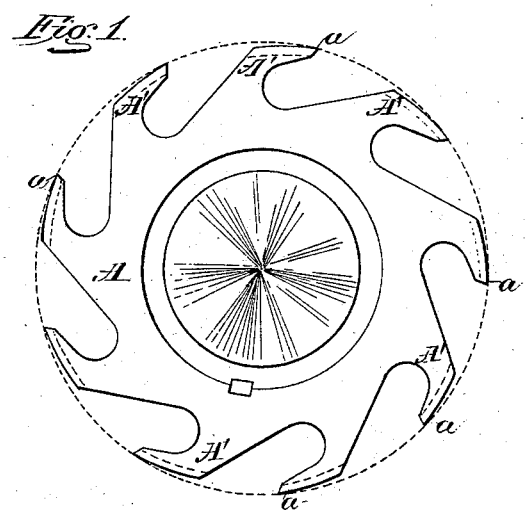
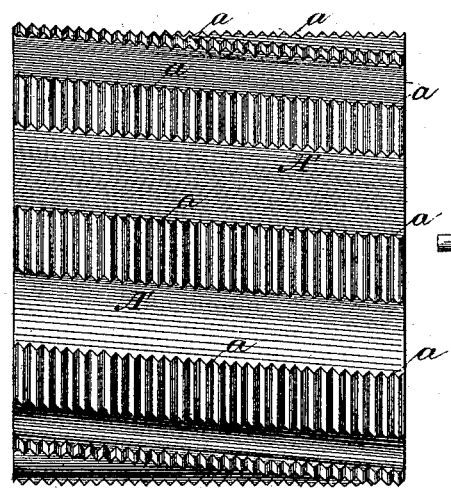
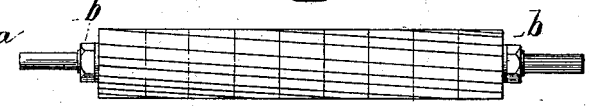
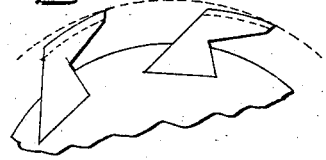
Witnesses:
Inventor:
James L. Perry
by Stout & Underwood
Attorneys.

UNITED STATES PATENT OFFICE.

JAMES L. PERRY, OF BERLIN, WISCONSIN.

ABRADING-CYLINDER.

SPECIFICATION forming part of Letters Patent No. 285,666, dated September 25, 1883.

Application filed June 20, 1883. (No model.)

*To all whom it may concern:*

Be it known that I, JAMES L. PERRY, of Berlin, in the county of Green Lake and in the State of Wisconsin, have invented certain new and useful Improvements in Abrading-Cylinders; and I do hereby declare that the following is a full, clear, and exact description thereof.

My invention relates to abrading-heads, and will be fully described hereinafter.

In the drawings, Figure 1 is an end view of my improved abrader. Fig. 2 is a side view of a section of the same. Fig. 3 is a side view of an entire cylinder, and Fig. 4 is an end view of a portion broken away from a cylinder and showing a modification of my invention.

A is the body of my abrader-head, which is constructed of the best tool-steel, and this cylinder is milled out at regular intervals to form ridges A', and these ridges are in turn grooved transversely, as shown in Fig. 2, to form teeth $a$, and from the point of the teeth back to the rear of each ridge is beveled, as shown in Figs. 1 and 4, so that only the forward edges of the teeth may enter the material to be dressed.

I make the abrader-head as follows: I take a perfect cylinder and thread it just as an ordinary screw-bolt is threaded, and I then mill out the surface to form the ridges A', after which I reduce the rear portion of the teeth $a$ to make their points prominent, as before stated. As the teeth are formed by spirally grooving the cylinder, it will be perceived that after the ridges have been made the teeth on one ridge will make an entirely different cut from those made by the teeth on any other ridge. For instance, if there be twelve teeth to the inch and nine ridges on the cutter-head, a board passed over the cutter-head will receive one hundred and eight cuts to the inch, and each cut will be out of line with those preceding it; and therefore my abrader will have the combined effect of a planer and sand-paper roll in reducing the material to an even surface and thickness, but will not, like a planer, be liable to split up the board or tear the material operated upon, such as cross-grain wood. Each of the grooves that separate the ridges extends beneath the face of a ridge to give play to the sharpening-tool, and the faces of the teeth are all made on the same incline, so that when the teeth are sharpened the circumference of the head will be reduced uniformly, and it will only be necessary to slightly raise the head and its bearing to make it produce the same depth of cut that it made before sharpening.

Instead of making the ridges integral with the head, I may make dovetail channels along its length, and providing ridges or knives, as shown in Fig. 4, insert them in the channels and hold them in place by wide washers slipped onto the shaft before the nuts $b\ b$ are screwed into place.

My cutter-head is made preferably in sections, as shown in the drawings, which sections are held together on the shaft by the nuts $b$, and the ridges are preferably made slightly diagonal, so that they will have a shearing action, and even if the teeth on the head are omitted the same effect will be produced by the shear-blades, but in a minor degree.

What I claim as new, and desire to secure by Letters Patent, is—

The cutter-head consisting of a series of ridges having teeth, a continuation of which would form a screw-thread about the entire periphery of the head, as set forth.

In testimony that I claim the foregoing I have hereunto set my hand, on this 31st day of May, 1883, in the presence of two witnesses.

JAMES L. PERRY.

Witnesses:
STANLEY S. STOUT,
H. G. UNDERWOOD.